United States Patent Office 3,455,880
Patented July 15, 1969

3,455,880
PROCESS FOR PRODUCING POLYPHENYLENE
ETHERS
Hidehiko Kobayashi, Hiroshi Ohama, and Shin-Ichi Izawa,
Tokyo, Japan, assignors to Asahi Kasei Kogyo Kabushiki Kaisha, Osaka, Japan
No Drawing. Filed Oct. 31, 1967, Ser. No. 679,507
Claims priority, application Japan, Nov. 14, 1966,
41/74,433; Dec. 1, 1966, Ser. No. 41/78,334;
Apr. 27, 1967, Ser. No. 42/26,610
Int. Cl. C08g 23/18; C07d 15/06
U.S. Cl. 260—47                                5 Claims

ABSTRACT OF THE DISCLOSURE

Process for producing polyphenylene ether which comprises oxidizing 2,6-disubstituted phenol with oxygen in the presence of a cobalt chelate compound and at least a member selected from the group consisting of chlorides and carboxylates of metals of Group VIII of the Periodic Table of the Elements and acetylacetonates of manganese, iron, cobalt, nickel, copper and zinc.

BACKGROUND OF THE INVENTION

Field of the invention

This invention relates to a process for producing polyphenylene ethers by oxidizing 2,6-disubstituted phenols with oxygen.

Description of the prior art

We have found by this time that cobalt chelate compounds having the following general formula:

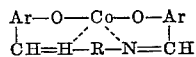

wherein Ar represents divalent aromatic residue, R represents divalent hydrocarbon residue containing at least 2 carbon atoms, and said R may contain hetero atoms such as oxygen and nitrogen in its chain, are effective for the oxidation of 2,6-disubstituted phenols to produce polyphenylene ethers, and filed an application for a patent under Japanese patent application No. 53,725/1966 on Aug. 17, 1966.

SUMMARY OF THE INVENTION

We now have found that polyphenylene ethers may be obtained in a higher yield than in the process of the above-mentioned patent application No. 53,725/1966 by oxidizing 2,6-disubstituted phenols with oxygen in the presence of a combination catalyst consisting of a cobalt chelate compound and at least a member selected from the group consisting of chlorides and carboxylates of metals of Group VIII of the Periodic Table of the Elements and acetylacetonates of manganese, iron, cobalt, nickel, copper and zinc.

2,6-Disubstituted phenols referred to herein designates phenols of the general formula:

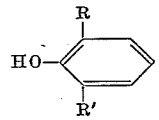

wherein R represents straight chain alkyl group having 1–4 carbon atoms and R' represents halogen or alkyl group having 1–4 carbon atoms.

The compounds in which both of substituents on 2,6-positions are halogens may not be oxidized according to the process of this invention due to their lower susceptibility to oxidation.

Also, when compounds in which both of substituents on 2,6-positions are alkoxy groups such as methoxy group are oxidized in accordance with the process of this invention, there may be produced a major portion of diphenoquinone and the contemplated polyphenylene ethers may not be obtained satisfactorily because of the steric hinderance of the alkoxy groups on 2,6-positions. Furthermore, the oxidation of phenols in which both of the substituents on 2,6-positions are alkyl groups having a branch at α-position tends to produce diphenoquinone due to the steric entanglement of the alkyl groups and, therefore, the object of this invention may not be accomplished.

Typical examples of 2,6-disubstituted phenols which may be used as a starting material in the process of this invention include 2,6-dimethylphenol, 2-methyl-6-ethylphenol, 2,6-diethylphenol, 2-methyl-6-n-propylphenol, 2-methyl-6-n-butylphenol, 2,6-di-n-propylphenol, 2-ethyl-6-n-propylphenol, 2-methyl-6-chlorophenol, 2-methyl-6-bromophenol, 2-methyl-6-isopropylphenol and 2-methyl-6-isopropylphenol.

The term "cobalt chelate compounds" as used herein designates oxygen-carrying chelate compounds which are capable of adsorbing and desorbing oxygen reversibly. Typical examples of these compounds include compounds of the general formula

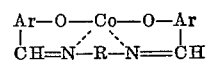

wherein Ar represents divalent aromatic residue, R represents divalent hydrocarbon residue containing at least 2 carbon atoms, and said R may contain hetero atoms such as oxygen and nitrogen in its chain. In addition, coordination compounds of the above-mentioned compounds such as pyridine; water, oxygen and alcohols may also be conveniently used in the process of this invention. These compounds may be exemplified by the formulae,

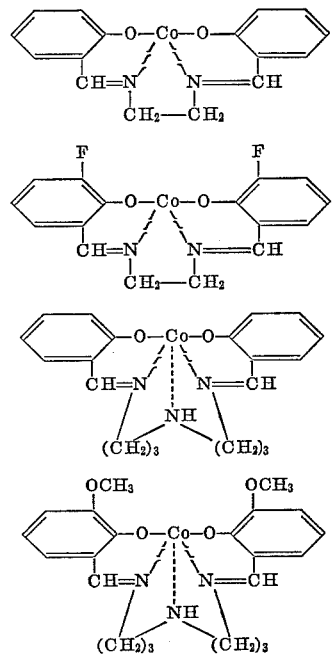

These compounds mentioned above are capable of conveying oxygen in a solvent system or in a crystal in the same manner as hemoglobin does in a living organism.

Typical examples of the chlorides of metals of Group VIII as described above include cobalt dichloride hexahydrate, cobalt trichloride, nickel dichloride hexahydrate, ferrous chloride and ferric chloride.

Typical examples of the above-mentioned carboxylates of metals of Group VIII include acetate, propionate, benzoate, succinate and adipate of metals of Group VIII of the Periodic Table of the Element.

Acetylacetonates which may be used in the process of this invention include various acetylacetonates represented by the following formulae:

$$Mn(CH_2COCH_2COCH_3)_2$$
$$Mn(CH_2COCH_2COCH_3)_3$$
$$Fe(CH_2COCH_2COCH_3)_2$$
$$Fe(CH_2COCH_2COCH_3)_3$$
$$Co(CH_2COCH_2COCH_3)_2$$
$$Co(CH_2COCH_2COCH_3)_3$$
$$Ni(CH_2COCH_2COCH_3)_2$$
$$Cu(CH_2COCH_2COCH_3)_2$$
$$Zn(CH_2COCH_2COCH_3)_2$$

These compounds exemplified above may be used in admixture of two or more kinds.

In the process of this invention, the amount of cobalt chelate compound used is 1–20 mol percent, and most preferably 3–5 mol percent based on the 2,6-disubstituted phenols. The amount of chlorides, carboxylates or acetylacetonates as specified above to be used together with the cobalt chelate compound is preferably 5–20 mol percent based on said cobalt chelate compound.

Any compounds which are less susceptible to oxidation than 2,6-substituted phenols to be oxidized and are inert to intermediates produced in the course of the reaction may be used as the reaction media in the process of this invention.

For example, aromatic hydrocarbons such as benzene, toluene and xylene; saturated hydrocarbons; alcohols such as methanol, ethanol and propanol; alkylnitriles and chloroform are generally usable. These compounds may be used either alone or in admixture of two or more kinds.

In general, the use of reaction media which are non-solvent to polyphenylene ether produced has disadvantage in that it leads to the formation of polyphenylene ether having a low molecular weight.

In practising the process of this invention, a reaction temperature ranging from 0° C. to 100° C., and preferably from 20 to 70° C., is used. However, the oxidation may be proceeded at a temperature in the vicinity of the boiling point of xylene depending upon the type of compound to be oxidized.

Also, if the reaction is carried out in a system in which the concentration of oxygen present therein is not decreased below a certain level as in a sealed tube under a pressure of oxygen, even higher temperature can be used without causing any adverse effect.

The reaction products obtained in the process of this invention vary in a wide range depending upon the type of catalyst, the type of reaction medium, and the type of the starting phenols employed, and there are produced polyphenylene ether, oligophenylene ether, quinone derivatives, diphenoquinones, bisphenols, and polyphenols in various proportions.

Among these oxidation products mentioned above, polyphenylene ethers have a practical utility. These polyphenylene ethers are normally soluble in halogenated or aromatic hydrocarbons and they may be formed into various shaped articles from such solutions. These polyphenylene ethers have great utility as high molecular materials because of their excellent heat stability, good resistances to hydrolysis, acid and alkali and superior electric characteristics.

DESCRIPTION OF THE PREFERRED EMBODIMENTS

This invention may be explained more fully and practically in the following examples. It should not be construed, however, that these examples restrict this invention as they are given merely by way of illustration:

Comparative Example 1.—Into 80 ml. of benzene was dissolved 1 g. of cobalt chelate compound of the following formula

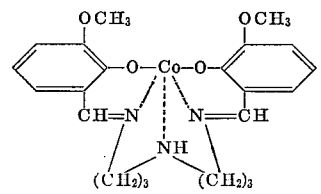

and to the resulting mixture was added 0.4 g. of p-toluenesulfonic acid with stirring. At this point, there was formed a small amount of black precipitates. To the resulting mixture was fed a gaseous oxygen for 5 minutes at a rate of 300 ml./min., and thereafter, there was added 5.0 g. of 2,6-dimethylphenol.

After the reaction was carried out for an hour while feeding gaseous oxygen at the same rate as mentioned above, a portion insoluble in benzene was filtered off. The layer of benzene was extracted with aqueous alkali solution to recover 2.2 g. of unreacted 2,6-dimethylphenol.

The distillation of benzene yielded 2.4 g. of residue which was insoluble in alkali.

The resultant residue was fractionated by using n-hexane, benzene and methanol to give 1.1 g. of 2,6-methylbenzoquinone, and 1.2 g. of polyphenylene ether. The 2,6-dimethylbenzoquinone fraction had a melting point of 70–71° C. and identified with standard 2,6-dimethylbenzoquinone. As a result of comparison of the resulting polyphenylene ether fraction with that synthesized in the conventional process known heretofore, it was confirmed that said fraction obtained in the instant comparative example shows the identical maximum absorbances at 2930, 1605, 1470, 1303, 1185 and 1020 cm.$^{-1}$ in an infrared spectrum and that it has the same chemical structure as that of the standard sample as a result of the elementary analysis.

Comparative Example 2.—Comparative Example 1 was repeated according to the same procedures as described therein except that 1.0 g. of cobalt chelate compound of the formula

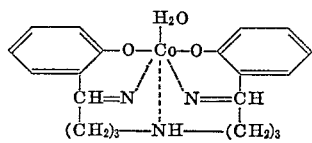

was dissolved in 100 ml. of chloroform.

As a result, 0.4 g. of 2,6-dimethylbenzoquinone, 1.5 g. of 3,3',5,5'-tetramethyldiphenoquinone and 1.8 g. of polyphenylene ether were obtained.

It was confirmed that the resulting diphenoquinone shows the identical maximum absorbances at 1585, 1200, 1042 and 910 cm.$^{-1}$ in an infrared spectrum as compared with diphenoquinone obtained in the conventional process known heretofore and that it has the same chemical structure as that of the standard sample as determined by the elementary analysis.

Comparative Example 3.—Comparative Example 1 was repeated according to the same procedures as described therein except that 1.0 g. of cobalt chelate compound of the formula

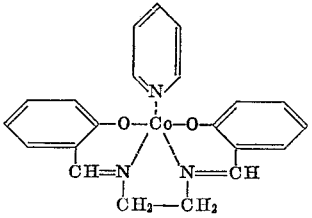

was used.

As a result, 1.3 g. of the starting 2,6-dimethylphenol was recovered and there were obtained 2.5 g. of 2,6-dimethylbenzoquinone and 0.9 g. of polyphenylene ether as oxidation products.

Example 1.—In 70 ml. of benzene was dissolved 2.0 g. of the same cobalt chelate compound as used in Comparative Example 2 and at this point, there was formed a small insoluble precipitate.

To the resulting mixture was added a solution containing 0.2 g. of cobalt trichloride in 7 ml. of alcohol and gaseous oxygen was passed therethrough at a rate of 250 ml./min. with stirring.

To the solution was added 10.0 g. of 2,6-dimethylphenol in one portion. The temperature of the reactor was lowered by 10° C. due to the endothermic dissolution of the charged 2,6-dimethylphenol, immediately followed by the raising in the temperature due to the heat of oxidation reaction which reached as high as about 50° C., in the course of approximately 10 minutes.

The reaction was further carried on for another 30 minutes while passing gaseous oxygen therethrough. After the insoluble matters were filtered off, the reaction mixture was poured into 1000 ml. of methanol to precipitate a polymer. Yield of the polymer was 45% and a reduced viscosity of the resulting polymer as measured in 0.2% benzene solution was 0.36. The structure of the resulting polymer was determined by the infrared spectrum, nuclear magnetic resonance and elementary analysis, and it was confirmed that the polymer contains a recurring unit as shown by the formula

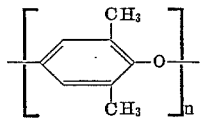

The fractionation of the insoluble portion of the reaction mixture yielded 0.4 g. of 3,3′,5,5′-tetramethyldiphenoquinone.

Example 2.—Example 1 was repeated according to the same procedures as described therein except that 10.0 g. of 2,6-dimethylphenol and 0.2 g. of $NiCl_2 \cdot 6H_2O$ were used. As a result, polyphenylene ether was obtained in a yield of 51%. According to the examination by infrared spectrum, nuclear magnetic resonance and the elementary analysis, it was confirmed that the resulting polymer was a linear polymer having the recurring units connected at 4-position as shown in Example 1. The polymer had a reduced viscosity of 0.22. From the insoluble portion of the reaction mixture, there was obtained 1.2 g. of 3,3′,5,5′-tetraethyldiphenoquinone.

Example 3.—Example 2 was repeated according to the same procedures as described therein except that 10.0 g. of 2-methyl-6-ethylphenol was used. As a result, the yield of the resulting polymer was 39% and the polymer had a reduced viscosity of 0.19. The yield of 3,5-dimethyl-3′,5′-diethyldiphenoquinone was 1.0 g.

Example 4.—Example 1 was repeated according to the same procedures as described therein except that 0.2 g. of $CoCl_2 \cdot 6H_2O$ was used. As a result, a polymer having a reduced viscosity of 0.60 was obtained in a yield of 75%. The polymer was formed into a tough and colorless film from chloroform solution thereof. The yield of diphenoquinone was 0.5 g.

Example 5.—In 70 ml. of benzene was dissolved 2.0 g. of the same cobalt chelate compound as used in Comparative Example 3 and to the resulting mixture was added a solution containing 0.10 g. of $FeCl_3$ in 7 ml. of ethanol, and gaseous oxygen was passed therethrough at a rate of 250 ml./min. with vigorous stirring. To the resulting mixture was added 8.0 g. of 2,6-dimethylphenol and the reaction was carried out for an hour.

An insoluble portion of the reaction mixture which weighed about 1.8 g. consisted of the cobalt chelate compound used as a catalyst and 3,3′,5,5′-tetramethyldiphenoquinone.

The reaction mixture from which the insoluble portion was removed was poured into 1000 ml. of methanol to precipitate a polymer.

The yield of polyphenylene ether was 4.6 g. and the reduced viscosity thereof was 0.21.

Example 6.—The polymerization of 2,6-dimethylphenol was conducted according to the same procedures as in Example 5 by using 2.0 g. of the same cobalt chelate compound as used therein and 0.2 g. of $CoCl_2 \cdot 6H_2O$. As a result, polyphenylene ether having a reduced viscosity of 0.55 was obtained in a yield of 5.1 g. The resulting polymer was formed into a tough film from benzene solution thereof. The yields of diphenoquinone and 2,6-dimethylbenzoquinone in the instant Example were 0.3 g. and less than 0.1 g., respectively.

Example 7.—8.0 g. of 2,6-dimethylphenol was oxidized according to the same procedures as described in Example 5 except that $NiCl_2 \cdot 6H_2O$ was used. As a result, polyphenylene ether having a reduced viscosity of 0.38 was obtained in a yield of 5.1 g. The resultant polymer was formed into a film from chloroform solution thereof.

Example 8.—Example 6 was repeated according to the same procedures as described therein except that 2.0 g. of the same cobalt chelate as used in Comparative Example 1 was used. As a result, polyphenylene ether having a reduced viscosity of 0.44 was obtained in a yield of 6.0 g. The resulting polymer was formed into a tough and transparent film from chloroform solution thereof.

Example 9.—In 100 ml. of ethanol were dissolved 2 g. of the same cobalt chelate compound as used in Example 1 and 0.2 g. of $FeCl_2$, and there was further added 10 g. of 2,6-diethylphenol while passing gaseous oxygen therethrough at a rate of 250 ml./min.

The heat of reaction was quite minimal and the reaction was carried out for 4 hours under such condition. When the reaction was nearly completed, a red insoluble precipitate was formed. The insoluble portion which weighed 1.2 g. was 3,3′,5,5′-diethyldiphenoquinone. After a portion soluble in ethanol was concentrated to dryness, the same was dissolved in benzene and washed with aqueous alkali to leave only polyphenylene ether in the layer of benzene. The yield of polyphenylene ether was 5.8 g. and the reduced viscosity thereof was 0.12. Although it was possible to precipitate the polymer from chloroform-methanol, a film prepared therefrom was quite brittle.

Example 10.—Example 9 was repeated according to the same procedures as described therein except that 10 g. of 2,6-dimethylphenol was used. As a result, there was yielded polyphenylene ether having a low molecular weight as in Example 9. The yield of the polymer was 6.2 g., and the reduced viscosity thereof was 0.11. The yield of diphenoquinone was 0.95 g.

Example 11.—In 50 ml. of chloroform was dissolved 2.0 g. of the same cobalt chelate compound as used in Comparative Example 2 and 0.2 g. of $$Mn(CH_2COCH_2COCH_3)_2$$

and gaseous oxygen was passed therethrough at a rate of 250 ml./min. To the resulting mixture was added 8.0 g. of 2,6-dimethylphenol in one portion. The reaction was proceeded immediately with a considerable generation of heat and the temperature in the reaction vessel was raised to as high as 50° C. after a lapse of about 10 minutes. The reaction was terminated after a lapse of 30 minutes and the reaction mixture was poured into 800 ml. of methanol to precipitate a polymer. Thus, polyphenylene ether having a reduced viscosity of 0.44 as measured in 0.2% benzene solution was obtained in a yield of 58%. The polymer was formed into a tough film from chloroform solution thereof.

From an insoluble portion precipitated in the reaction system, 3,3′,5,5′ - tetramethyldiphenoquinone was obtained in a yield of 4%.

Example 12.—Example 11 was repeated according to the same procedures as described therein except that 0.2 g. of $Fe(CH_2COCH_2COCH_3)_2$ was used in place of $Mn(CH_2COCH_2COCH_3)_2$. As a result, the reduced viscosity of the product polyphenylene ether was 0.78. The yield of the polymer was 65% and the yield of diphenoquinone by-produced was 7%.

Example 13.—In 45 ml. of benzene were dissolved 2.0 g. of the same cobalt chelate compound as used in Example 11 and 0.2 g. of $Co(CH_2COCH_2COCH_3)_2$ and gaseous oxygen was passed therethrough at a rate of 200 ml./min.

To the resulting mixture was added 8.0 g. of 2,6-dimethylphenol with stirring. The 2,6-dimethylphenol was endothermically dissolved immediately followed by the exothermic oxidation reaction and the temperature of the reaction vessel reached as high as 55° C. after a lapse of approximately 10 minutes. After the reaction was carried out for 30 minutes, the reaction mixture was poured into 1000 ml. of methanol to precipitate a polymer in flakes. The yield of the polymer was 65% and the reduced viscosity as measured in 0.2% benzene solution was 0.69. The polymer was formed into a tough film from benzene solution thereof.

Example 14.—Example 13 was repeated according to the same procedures as described therein except that 1.0 g. of the same cobalt chelate compound as used in Example 11 and 1.0 g. of $Co(CH_2COCH_2COCH_3)_2$ were used. As a result, the product polymer was obtained as precipitates in the form of flake in a yield of 87%.

The resulting polymer was considerably less colored as compared with the polymer obtained in Example 13 and a film obtained from benzene solution thereof was nearly colorless and transparent. The polymer had a reduced viscosity of 0.53 as measured in 0.2% benzene solution.

Example 15.—Example 13 was repeated according to the same procedures as described therein except that 0.2 g. of $Ni(CH_2COCH_2COCH_3)_2$ was substituted for $Co(CH_2COCH_2COCH_3)_2$. As a result, the yield of polyphenylene ether was 56% and the reduced viscosity was 0.40. There was by-produced about 10% of diphenoquinone.

Example 16.—In 50 ml. of benzene were dissolved 2.0 g. of the same cobalt chelate compound as used in Comparative Example 3 and 0.2 g. of $$Zn(CH_2COCH_2COCH_3)_2$$

and gaseous oxygen was passed therethrough at a rate of 250 ml./min. To the resulting solution was added 8.0 g. of 2,6-dimethylphenol in one portion with stirring. The endothermic dissolution of the same was immediately followed by the exothermic oxidation reaction and the temperature of the reaction vessel was raised as high as 45–50° C.

After passing gaseous oxygen therethrough for 30 minutes, the reaction mixture was poured into 1000 ml. of methanol to precipitate a polymer. The yield of polyphenylene ether was 53% and the reduced viscosity as measured in 0.2% benzene solution was 0.33. The polymer was formed into a film from chloroform solution thereof.

Example 17.—Example 16 was repeated according to the same procedures as described therein except that 0.2 g. of $Cu(CH_2COCH_2COCH_3)_2$ was used in place of $Zn(CH_2COCH_2COCH_3)_2$. A polymer in the form of flake was obtained by the precipitation in methanol. The yield was 48% and the reduced viscosity as measured in 0.2% benzene solution was 0.66. There was by-produced diphenoquinone in a yield of 13%.

Example 18.—In 50 ml. of toluene were dissolved 2.0 g. of the same cobalt chelate compound as used in Example 16 and 0.2 g. of $Ni(CH_2COCH_2COCH_3)_2$, and gaseous oxygen was passed therethrough at a rate of 250 ml./min. To the resulting mixture was added 8.0 g. of 2,6-dimethylphenol in one portion with stirring.

After the temperature of the reaction vessel was once lowered due to the endothermic dissolution of 2,6-dimethylphenol added, there was observed a rapid increase in the temperature due to the heat of reaction.

After a lapse of about 10 minutes at which the temperature of the reaction vessel reached 50° C., the reaction mixture cooled rapidly to room temperature. The passing of gaseous oxygen therethrough was further continued for another 30 minutes with stirring and the reaction mixture was poured into 1000 ml. of methanol to precipitate a polymer. The yield of the polymer was 60% and the reduced viscosity as measured in 0.2% benzene solution was 0.38.

Example 19.—Example 18 was repeated according to the same procedures as described therein except that 0.2 g. of $Fe(CH_2COCH_2COCH_3)_2$ was substituted for $Ni(CH_2COCH_2COCH_3)_2$.

The yield of the flake-like polymer obtained by pouring the reaction mixture into methanol was 50%. The reduced viscosity of the resulting polymer as measured in 0.2% benzene solution was 0.56.

Example 20.—2,6-dimethylphenol was oxidized according to the same procedures as described in Example 18 except that 1.0 g. of the same cobalt chelate compound as used in Example 16 and 1.0 g. of $$Co(CH_2COCH_2COCH_3)_2$$

were used.

As a result, the product polymer was obtained as precipitates in the form of flake and the yield was 91%. The polymer obtained in the instant example was remarkably less colored as compared with those obtained in other examples. The reduced viscosity of the resulting polyphenylene ether as measured in 0.2% benzene solution was 0.55. The polymer was formed into a tough film.

Example 21.—Into 80 ml. of benzene was dissolved 1.5 g. of the same cobalt chelate compound as used in Comparative Example 3 and to the resulting solution was added a solution of 0.2 g. of $Co(OCOCH_3)_2 \cdot 4H_2O$ in 7 ml. of ethanol and gaseous oxygen was passed therethrough at a rate of 250 ml./min. with vigorous stirring. To the resulting mixture was added 10.0 g. of 2,6-dimethylphenol and the reaction was carried out for an hour.

2.0 g. of an insoluble portion consisting of the cobalt chelate compound used as a catalyst and 3,3',5,5'-tetramethyldiphenoquinone were deposited from the reaction mixture.

The reaction mixture from which the insoluble portion was removed was poured into 1000 ml. of methanol containing 10 ml. of concentrated hydrochloric acid to precipitate a flake-like polymer. The yield of the polymer was 80% and the reduced viscosity as measured in 0.2% benzene solution was 0.56. The structure of the resulting polymer was determined by the infrared spectrum, nuclear magnetic resonance and elementary analysis and it was confirmed that the polymer contain a recurring unit shown by the formula

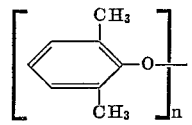

Example 22.—Example 21 was repeated according to the same procedures as described therein except that 0.1 g. of $Ni(OCOCH_3)_2$ was used in place of $$Co(OCOCH_3)_2 \cdot 4H_2O$$

As a result, polyphenylene ether was obtained in a yielded of 69%. The polymer had a reduced viscosity of 0.44 as measured in 0.2% benzene solution. 0.8 g. of 3,3',5,5'-tetramethyldiphenoquinone was by-produced.

Example 23.—Example 21 was repeated according to the same procedures as described therein except that 0.2 g. of $Fe(OCOCH_3)_2 \cdot 4H_2O$ was substituted for $$Co(OCOCH_3)_2 \cdot 4H_2O$$

As a result, the yield of the product polymer was 6.5 g. and the reduced viscosity of the polymer was 0.40 as measured in 0.2% benzene solution. 0.2 g. of 3,3',5,5'-tetramethyldiphenolquinone was by-produced, but no 2,6-dimethylbenzoquinone was by-produced.

Example 24.—Into 70 ml. of benzene was dissolved 2.0 g. of the same cobalt chelate compound as used in Comparative Example 2 and the resulting solution was added 0.2 g. of Co(OCOCH$_3$)$_2$·4H$_2$O and gaseous oxygen was passed therethrough at a rate of 200 ml./min. with vigorous stirring. To the reaction mixture was then added 12.0 g. of 2,6-dimethylphenol in one portion and the temperature of the reactor was raised to about 50° C. by the heat of reaction and the reaction was completed in 30 minutes.

After an insoluble portion was filtered off, the reaction mixture was poured into 100 ml. of methanol containing 10 ml. of concentrated hydrochloric acid to precipitate a flake-like polymer. The yield of the polymer was 70% and the reduced viscosity as measured in 0.2% benzene solution was 0.68.

Example 25.—According to the procedures as described in Example 24, 12.0 g. of 2-methyl-6-ethylphenol was oxidatively polymerized. As a result, the yield of the polymer was 55% and the reduced viscosity was 0.44. 0.8 g. of 3,5-dimethyl-3',5'-diethyldiphenoquinone was by-produced in the reaction. The product polyphenylene ether thus obtained was a transparent matter in pale yellowish color which could be formed into a tough film from chloroform solution.

Example 26.—Example 24 was repeated according to the same procedures as described therein except that 0.2 g. of Ni(OCOCH$_3$)$_2$·4H$_2$O was substituted for $$Co(OCOCH_3)_2 \cdot 4H_2O$$

As a result, the yield of the product polymer was 80% and the reduced viscosity as measured in 0.2% benzene solution was 0.33, 0.9 g. of 3,3',5,5'-tetramethyldiphenoquinone was by-produced.

Example 27.—Example 21 was repeated according to the same precedures as described therein except that 0.3 g. of cobalt benzoate Co(C$_7$H$_5$O$_2$)$_2$·4H$_2$O in 7 ml. of ethanol was used in place of Co(OCOCH$_3$)$_2$·4H$_2$O.

The yield of the resulting flake-like polyphenylene ether was 8.4 g. and the reduced viscosity as measured in 0.2% benzene solution was 0.50. 0.5 g. of 3,3',5,5'-tetramethyl-diphenoquinone was by-produced.

Example 28.—Example 27 was repeated according to the same procedures as described therein except that 0.3 g. of Ni(C$_7$H$_5$O$_2$)$_2$·3H$_2$O was substituted for $$Co(C_7H_5O_2)_2 \cdot 4H_2O$$

As a result, the yield of the product polymer was 5.5 g. and the reduced viscosity as measured in 0.2% benzene solution was 0.38.

Example 29.—Into 100 ml. of chloroform was dissolved 2.0 g. of the same cobalt chelate compound as used in Example 21 and to the resulting solution was added 0.3 g. of benzoic acid-iron complex $$[Fe_3(C_6H_5COO)_6](C_6H_5COO)_3$$

and gaseous oxygen was passed therethrough with vigorous stirring. To the reaction mixture was then added 12.0 g. of 2,6-dimethylphenol in one portion and the reaction was carried out for 30 minutes.

After an insoluble portion was filtered off, the reaction mixture was poured into 1200 ml. of methanol containing 10 ml. of concentrated hydrochloric acid to precipitate a flake-like polymer.

The yield of the product polyphenylene ether was 2.0 g. and the reduced viscosity as measured in 0.2% benzene solution was 0.46.

We claim:
1. Process for producing polyphenylene ether which comprises oxidizing 2,6-disubstituted phenol having the general formula

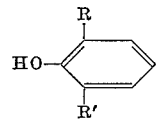

wherein R represents straight chain alkyl groups having 1–4 carbon atoms and R' represents a member selected from the group consisting of halogen, alkyl groups having 1–4 carbon atoms and alkoxy groups having 1–4 carbon atoms with oxygen in the presence of a cobalt chelate compound selected from the group consisting of the compounds represented by the following formulas

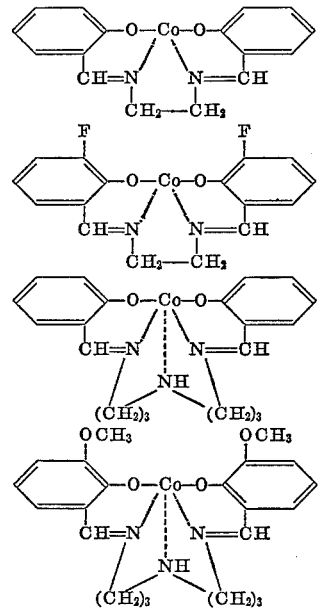

in an amount of 1–20 mol percent based on the starting 2,6-disubstituted phenols, and at least one compound selected from the group consisting of chlorides and carboxylates of metals of Group VIII of the Periodic Table of the Elements and acetylacetonates of manganese, iron, cobalt, nickel, copper and zinc in an amount of 5–20 mol percent based on said cobalt chelate compound.

2. Process according to claim 1 wherein said chloride of metals of Group VIII of the Periodic Table of the Elements is selected from the group consisting of cobalt dichloride hexahydrate, cobalt trichloride, nickel dichloride hexahydrate, ferrous chloride and ferric chloride.

3. Process according to claim 1 wherein said carboxylate is selected from the group consisting of acetate, propionate, benzoate, succinate and adipate.

4. Process according to claim 1 wherein said acetylacetonate is selected from the group consisting of Mn(CH$_2$COCH$_2$COCH$_3$)$_3$
Fe(CH$_2$COCH$_2$COCH$_3$)$_3$
Co(CH$_2$COCH$_2$COCH$_3$)$_3$
Mn(CH$_2$COCH$_2$COCH$_3$)$_2$
Fe(CH$_2$COCH$_2$COCH$_3$)$_2$
Co(CH$_2$COCH$_2$COCH$_3$)$_2$
Ni(CH$_2$COCH$_2$COCH$_3$)$_2$
Cu(CH$_2$COCH$_2$COCH$_3$)$_2$
Zn(CH$_2$COCH$_2$COCH$_3$)$_2$ 5. Process according to claim 1 wherein the oxidation is carried out at a temperature of 0° C. to 100° C.

References Cited

UNITED STATES PATENTS 3,306,875  2/1967  Hay _____ 260—47
3,337,501  8/1967  Bussink et al. _____ 260—47

WILLIAM H. SHORT, Primary Examiner

M. GOLDSTEIN, Assistant Examiner